(12) United States Patent
Sundara et al.

(10) Patent No.: US 10,003,084 B2
(45) Date of Patent: Jun. 19, 2018

(54) METAL NANOPARTICLE-GRAPHENE COMPOSITES AND METHODS FOR THEIR PREPARATION AND USE

(71) Applicant: INDIAN INSTITUTE OF TECHNOLOGY MADRAS, Chennai (IN)

(72) Inventors: Ramaprabhu Sundara, Chennai (IN); Vinayan Bhaghavathi Parambath, Malappuram (IN); Rupali Nagar, Lucknow (IN)

(73) Assignee: INDIAN INSTITUTE OF TECHNOLOGY MADRAS, Chennai (IN)

(*) Notice: Subject to any disclaimer, the term of this patent is extended or adjusted under 35 U.S.C. 154(b) by 225 days.

(21) Appl. No.: 14/413,395

(22) PCT Filed: Jun. 28, 2013

(86) PCT No.: PCT/IB2013/055311
§ 371 (c)(1),
(2) Date: Jan. 7, 2015

(87) PCT Pub. No.: WO2014/009835
PCT Pub. Date: Jan. 16, 2014

(65) Prior Publication Data
US 2015/0255801 A1 Sep. 10, 2015

(30) Foreign Application Priority Data
Jul. 7, 2012 (IN) ............ 2753/CHE/2012

(51) Int. Cl.
H01M 4/92 (2006.01)
H01M 4/90 (2006.01)
(Continued)

(52) U.S. Cl.
CPC ......... H01M 4/926 (2013.01); H01M 4/9041 (2013.01); H01M 4/9083 (2013.01);
(Continued)

(58) Field of Classification Search
CPC .. H01M 4/926; H01M 4/9041; H01M 4/9083; H01M 4/92; H01M 8/102;
(Continued)

(56) References Cited

U.S. PATENT DOCUMENTS

2011/0065570 A1 3/2011 Hu et al.

FOREIGN PATENT DOCUMENTS

WO 2011116169 A2 9/2011

OTHER PUBLICATIONS

Borup, R., et al., "Scientific Aspects of Polymer Electrolyte Fuel Cell Durability and Degradation," Chem. Rev, 2007, pp. 3904-3951, vol. 107.
(Continued)

*Primary Examiner* — Ula C Ruddock
*Assistant Examiner* — Thomas H. Parsons

(57) ABSTRACT

Methods of forming metal nanoparticle-graphene composites are provided. The methods can include mixing a metal precursor with graphite oxide in the presence of a liquid medium to form a metal precursor-graphite oxide mixture, and exfoliating the graphite oxide and reducing the metal precursor in the metal precursor-graphite oxide mixture to deposit metal nanoparticles on a first major surface of a graphene sheet formed by exfoliation of the graphite oxide.

20 Claims, 7 Drawing Sheets

(51) Int. Cl.

| | |
|---|---|
| *H01M 8/1018* | (2016.01) |
| *B01J 23/14* | (2006.01) |
| *B01J 23/42* | (2006.01) |
| *B01J 23/44* | (2006.01) |
| *B01J 23/46* | (2006.01) |
| *B01J 23/50* | (2006.01) |
| *B01J 23/52* | (2006.01) |
| *B01J 23/755* | (2006.01) |
| *B82Y 40/00* | (2011.01) |

(52) U.S. Cl.
CPC .............. *H01M 4/92* (2013.01); *H01M 4/921* (2013.01); *H01M 8/1018* (2013.01); *B01J 23/14* (2013.01); *B01J 23/42* (2013.01); *B01J 23/44* (2013.01); *B01J 23/462* (2013.01); *B01J 23/50* (2013.01); *B01J 23/52* (2013.01); *B01J 23/755* (2013.01); *B82Y 40/00* (2013.01); *H01M 2008/1095* (2013.01); *H01M 2300/0082* (2013.01)

(58) Field of Classification Search
CPC .. H01M 2008/1095; B01J 23/14; B01J 23/42; B01J 23/44; B01J 23/462; B01J 23/50; B01J 23/52; B01J 23/755
See application file for complete search history.

(56) References Cited

OTHER PUBLICATIONS

D'Angelo, A.J., "Investigation and Synthesis of Novel Graphene-Based Nanocomposites for Hydrogen Storage," University of South Florida Scholar Commons, Jan. 2012, pp. 1-131.
International Search Report and Written Opinion for counterpart International Patent Application No. PCT/IB2013/055311 dated Jan. 14, 2014, 166 pages.
Kaniyoor, A., et al., "Graphene synthesis via hydrogen induced low temperature exfoliation of graphite oxide," Journal of Materials Chemistry, Sep. 7, 2010, pp. 8467-8469, vol. 20, No. 39.
Kaniyoor, A., et al. "Graphene synthesis via hydrogen induced low temperature exfoliation of 7 graphite oxide-Supplementary Information," Journal of Materials Chemistry, 2010, pp. 1-9, vol. 20.
Kou, R., et al., "Stabilization of Electrocatalytic Metal Nanoparticles at Metal-Metal Oxide-Graphene Triple Junction Points," Journal of American Chemical Society, Feb. 8, 2011, pp. 2541-2547, vol. 133, No. 8.
Li, Y., et al., "Catalytic performance of Pt nanoparticles on reduced graphene oxide for methanol electro-oxidation," Carbon, Apr. 2010, pp. 1124-1130, vol. 48, No. 4.
Li, Y., et al., "Preparation and electrochemical performance for methanol oxidation of pt/graphene nanocomposites," Electrochemistry Communications, Apr. 2009, pp. 846-849, vol. 11, No. 4.
Parambhath, V.B., et al., "Investigation of Spillover Mechanism in Palladium DecoratedHydrogen Exfoliated Functionalized Graphene," The Journal of Physical Chemistry C, 2011, pp. 15679-15685, vol. 115, No. 31.
Rajalakshmi, N., et al., "Performance of polymer electrolyte membrane fuel cells with carbon nanotubes as oxygen reduction catalyst support material," Journal of Power Sources, 2005, pp. 250-257, vol. 140.
Rao, C.V., et al., "Synthesis and electrocatalytic oxygen reduction activity of graphene-supported Pt3Co and Pt3Cr alloy nanoparticles," Carbon, Mar. 2011, pp. 931-936, vol. 49, No. 3.
Reddy, A.L.M. et al., "Performance of Proton Exchange Membrane Fuel Cells Using Pt/MWNT—Pt/C Composites as Electrocatalysts for Oxygen Reduction Reaction in Proton Exchange Membrane Fuel Cells," J. Fuel Cell Sci. Technol, Dec. 30, 2009, pp. 021001-021007, vol. 7, No. 2.
Reddy, A.L.M., and Ramaprabhu, S., "Pt/SWNT-Pt/C Nanocomposite Electrocatalysts for Proton-Exchange Membrane Fuel Cells," J. Phys. Chem. C, Oct. 17, 2007, pp. 16138-16146, vol. 111, No. 44.
Seger, B., and Kamat, P.V., "Electrocatalytically Active Graphene-Platinum Nanocomposites. Role of 2-D Carbon Support in PEM Fuel Cells," J. Phys. Chem. C, 2009, pp. 7990-7995, vol. 113, No. 19.
Si, Y., and Samulski, E.T., "Exfoliated Graphene Separated by Platinum Nanoparticles," Chem. Mater, 2008, pp. 6792-6797, vol. 20, No. 21.
Sun, Y., et al., "Graphene based new energy materials," Energy Environ. Sci, Feb. 5, 2011, pp. 1113-1132, vol. 4.
Wang, Y., et al., "High-quality reduced grapheme oxidenanocrystalline platinum hybrid materials prepared by simultaneous co-reduction ofgraphene oxide and chloroplatinic acid," Nanoscale Research Letter, 2011, pp. 1-8, vol. 6, No. 241.
Zhong, C.-J., et al., "Fuel cell technology: nano-engineered multimetallic catalysts," Energy Environ. Sci, Aug. 29, 2008, pp. 454-466, vol. 1, No. 4.
Zhu, J., et al., "Facile synthesis of metal oxide/reduced graphene oxide hybrids with high lithium storage capacity and stable cyclability," Nanoscale, 2011, pp. 1084-1089, vol. 3.

METAL NANOPARTICLE-GRAPHENE COMPOSITES AND METHODS FOR THEIR PREPARATION AND USE

CROSS-REFERENCE TO RELATED APPLICATIONS

This application is a U.S. National Stage filing under 35 U.S.C. § 371 of International Application No. PCT/IB13/055311 filed on Jun. 28, 2013, which in turn claims priority to Indian Patent Application No. 2753/CHE/2012 filed on Jul. 7, 2012, the content of both of these applications is hereby incorporated by reference in their entireties.

BACKGROUND

Proton exchange membrane fuel cells (PEMFCs) are used for a variety of mobile and transport applications owing to their substantially high energy conversion efficiency, low emissions and relatively low operating temperatures. In a typical PEMFC, hydrogen gas is supplied to the anode and oxygen gas is supplied to the cathode of the fuel cell. Hydrogen is oxidized to form protons while releasing electrons into an external circuit. Further, oxygen is reduced at the cathode to form reduced oxygen species. Protons travel across a proton-conducting membrane to the cathode to react with reduced oxygen species forming water.

A PEMFC employs a polymer membrane that is ionically conducting and electrically insulating in nature that channels the positive charges during operation of the PEMFC. In order for the oxidation and reduction reactions in the fuel cell to occur at desired rates, electrocatalysts are required. Typically electrocatalysts are coated on the anode and cathode electrodes and a polymer electrolyte membrane is disposed between the anode and the cathode electrodes to form a membrane electrode assembly (MEA). Typically, PEMFCs use noble metals such as platinum as electrocatalysts to facilitate the fuel oxidation and oxidant reduction. Unfortunately, such electrocatalysts are substantially expensive and are not durable thereby inhibiting their use in large-scale applications of fuel cells.

Some PEMFCs use carbon supported platinum as an electrocatalyst material. However, during operation of the fuel cell, carbon may be electrochemically oxidized leading to agglomeration of metal nanoparticles dispersed on the support material and often detachment of the nanoparticles from the support material. This results in degradation of the fuel cell performance.

Other electrocatalyst supporting materials used in the PEMFCs include carbon nanotubes and graphitic mesoporous carbon. Again, a substantially high cost along with low stability of such materials renders them unsuitable for certain applications.

Another electrocatalyst supporting material currently used for fuel cell applications is graphene. Typically, graphene surface is chemically modified to enable deposition of metal nanoparticles on the surface. Such surface modifications are performed using processes such as acid oxidation, ionic liquid linking and plasma treatments. However, most of these surface treatments result in destruction of the graphene structure leading to a decrease in its surface area and reduced electrical conductivity.

Moreover, some of these surface treatment processes may often require additional steps before metal nanoparticles deposition on the graphene surface adding to the overall processing costs. The existing techniques for attachment of metal nanoparticles on graphene include chemical reduction techniques such as sodium borohydride reduction and ethylene glycol techniques. However, these techniques are time consuming, involve high amounts of energy and are substantially expensive. In addition, these techniques do not provide complete reduction of the precursor and require purification steps to remove the reducing agents used in the reduction process. The metal nanoparticles dispersed using the existing techniques often result in agglomeration of the nanoparticles and large particle sizes of the nanoparticles thereby degrading the performance of the fuel cell.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, methods of forming metal nanoparticle-graphene composites are provided. The methods can include mixing a metal precursor with graphite oxide in the presence of a liquid medium to form a metal precursor-graphite oxide mixture, and exfoliating the graphite oxide and reducing the metal precursor in the metal precursor-graphite oxide mixture to deposit metal nanoparticles on a first major surface of a graphene sheet formed by exfoliation of graphite oxide.

In accordance with another aspect, metal nanoparticle-graphene composites are provided. The metal nanoparticle-graphene composites can be formed by exfoliating graphite oxide in the presence of hydrogen gas ($H_2$) to form a hydrogen-exfoliated graphene sheet, and concurrently reducing a metal precursor using the hydrogen gas to disperse a plurality of metal nanoparticles on a first major surface of the hydrogen-exfoliated graphene sheet.

In accordance with another aspect, methods of forming metal nanoparticle-graphene composites are provided. The methods can include exfoliating graphite oxide in the presence of hydrogen gas ($H_2$) to form a hydrogen-exfoliated graphene sheet, and concurrently reducing a metal precursor using the hydrogen gas to disperse a plurality of metal nanoparticles on a first major surface of the hydrogen-exfoliated graphene sheet.

In accordance with another aspect, electrocatalysts are provided. The electrocatalysts can include an exfoliated graphene sheet and a plurality of platinum nanoparticles dispersed on a first major surface of the exfoliated graphene sheet. An electrochemical surface area of the electrocatalyst is at least about 101.3 $m^2/g$.

In accordance with another aspect, electrocatalysts are provided. The electrocatalysts can include an exfoliated graphene sheet and a plurality of platinum nanoparticles dispersed on a first major surface of the exfoliated graphene sheet. A power density of a PEMFC using the electrocatalyst is at least about 673 mW $cm^2$.

In accordance with another aspect, electrocatalysts are provided. The electrocatalysts can include a hydrogen-exfoliated graphene sheet and a plurality of platinum nanoparticles dispersed on a first major surface of the hydrogen-exfoliated graphene sheet. An average size of the platinum nanoparticles is about 3 nanometers to about 5 nanometers and a current density of the electrocatalyst is at least about 1239 mA $cm^{-2}$.

DETAILED DESCRIPTION

Figure 1:
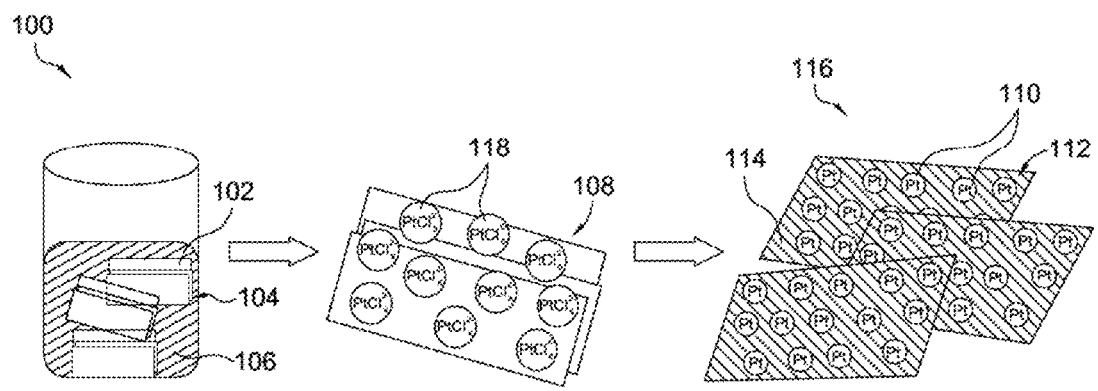
FIG. 1 illustrates materials and/or compositions used/formed at different stages of forming a metal nanoparticle-graphene composite.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

Example embodiments are generally directed to composites comprising graphene and metal nanoparticles, and use of such composites as electrocatalysts in fuel cell applications. The present technique provides a simple, cost-effective and efficient technique for electrocatalyst synthesis suitable for use in proton exchange membrane fuel cells (PEMFC) used in automotive and mobile applications, among others. In particular, the present technique provides a single-step reduction process for synthesis of a platinum-graphene electrocatalyst with enhanced performance as compared to present commercially available electrocatalysts.

Referring now to FIG. 1, materials and/or compositions 100 used/formed at different stages of forming a metal nanoparticle-graphene composite are illustrated. In the illustrated embodiment, a metal precursor 102 and graphite oxide 104 are mixed in the presence of a liquid medium 106 to form a metal precursor-graphite oxide mixture 108. Examples of the metal precursor 102 include, but are not limited to, platinum (Pt), palladium (Pd), silver (Ag), gold (Au), nickel (Ni), titanium (Ti), tin (Sn), ruthenium (Ru), or combinations thereof. In this example embodiment, the metal precursor 102 includes hexachloroplatinic acid ($H_2PtCl_6 \cdot 6H_2O$). Moreover, the liquid medium 106 may include water, acetone, ethanol toluene, or combinations thereof. The metal precursor-graphite mixture 108 is dried at a suitable temperature.

The mixing of the metal precursor 102 such as hexachloroplatinic acid (HPA) with graphite oxide 104 in the liquid medium 106 facilitates the interaction of $Pt^{4+}$ ions (from $PtCl_6^{2-}$) with the oxygen containing functional groups on the surface of graphite oxide 104. These surface functional groups render the surface of graphite oxide 104 hydrophilic and ensure better accessibility of platinum complexes to graphite oxide 104. These sites also serve as the adsorption sites where subsequent reduction and nucleation of Pt nuclei may take place.

Moreover, the metal precursor-graphite oxide mixture 108 is processed to exfoliate the graphite oxide 104 and to reduce the metal precursor 102 in the mixture 108 to deposit metal nanoparticles 110 on a first major surface 112 of a graphene sheet 114 formed by the exfoliation of the graphite oxide 104. Examples of the metal nanoparticles 110 include, but are not limited to, platinum (Pt), palladium (Pd), silver (Ag), gold (Au), nickel (Ni), titanium (Ti), tin (Sn), ruthenium (Ru), or combinations thereof. In this example embodiment, the metal nanoparticles 110 include platinum nanoparticles. It should be noted that the reduction of the metal precursor 102 to metal nanoparticles 110 occurs simultaneously with the exfoliation of the graphite oxide 104.

In certain example embodiments, the processing of the metal precursor-graphite oxide mixture 108 to exfoliate the graphite oxide 104 and to reduce the metal precursor 102 may include contacting the mixture 108 with hydrogen gas ($H_2$). In operation, hydrogen gas ($H_2$) is reacted with oxygen-based functional groups of graphite oxide 104 within a reaction chamber (not shown) to form the graphene sheet 114. Moreover, the metal precursor 102 is concurrently reduced using hydrogen gas to attach the metal nanoparticles 110 to the exfoliated graphene sheet 114 to form the metal nanoparticle-graphene composite 116. As can be seen, the $PtCl_6^{2-}$ ions 118 from the metal precursor-graphite oxide mixture 108 are reduced to the platinum nanoparticles 110 in the metal nanoparticle-graphene composite 116. In some embodiments, substantially 100 wt % of the metal precursor 102 is reduced to the metal nanoparticles 110.

In certain example embodiments, a temperature within the reaction chamber is about 200° C. to about 600° C. Specific examples of temperatures include 200° C., 250° C., 300° C., 350° C., 400° C., 450° C., 500° C., 550° C., 600° C., and ranges between any two of these values. The flow rate of hydrogen gas within the reaction chamber is about 50 standard cubic centimeters per minute (sccm) to about 200 sccm. Specific examples of flow rates include 50 sccm, 100 sccm, 150 sccm, 200 sccm, and ranges between any two of these values. In certain example embodiments, the metal precursor 102 is reduced to the metal nanoparticles 110 within about 10 seconds to about 15 seconds. In certain embodiments, a density of graphene in the metal nanoparticle-graphene composite 116 is about 0.5 g/cm$^3$ to about 0.8 g/cm$^3$.

In operation, once the temperature reaches the desired temperature within the reaction chamber, hydrogen gas reacts violently with the oxygen based functional groups, especially with —OH groups present in the graphite oxide 104 resulting in the formation of water vapor and $CO_2$ gas. This exothermic reaction imparts sufficient amount of force to overcome the Van der Waals forces of attraction that exist between the adjacent sheets and induces disordering leading to the formation of graphene sheet 114.

At the same time, the $H_2$ gas also initiates the reduction of metal ions such as $Pt^{4+}$ ions or metal complexes such as platinum complexes ($PtCl_6^{2-}$) 118 over the surface of graphite oxide 104 to metal nanoparticles such as Pt nanoparticles. These Pt nanoparticles are attached to the defective sites of the hydrogen exfoliated graphene sheet 114. Thus, in this process, both graphene 114 and metal nanoparticles such as Pt nanoparticles 110 are formed almost instantaneously. The metal nanoparticles (Pt nanoparticles 110) are uniformly distributed over the surface of the graphene sheet 114 with an optimum particle size.

An electrocatalyst may include the metal nanoparticle-graphene composite as described above. The metal nanoparticle-graphene composite can, for example, be platinum nanoparticle-graphene composite. In some embodiments, an electrochemical surface area of the electrocatalyst may be at least about 101.3 m$^2$/g. The metal nanoparticle-graphene composite may be formed by hydrogen exfoliation as described above. The metal nanoparticles in the metal nanoparticle-graphene composite may include substantially non-agglomerated nanoparticles.

In some embodiments, an average particle size of the metal nanoparticles, for example platinum nanoparticles, may be about 3 nanometers to about 5 nanometers. In an embodiment, the average particle size of the metal nanoparticles may be about 3.3 nanometers. In specific examples, the average particle size of the metal nanoparticles may include about 3 nanometers, about 3.5 nanometers, about 4 nanometers, about 4.5 nanometers, about 5 nanometers, or any ranges between any two of these values.

In some embodiments, the electrocatalyst can be configured to form an electrode of a proton exchange membrane fuel cell (PEMFC). A power density of the PEMFC using the electrocatalyst can be at least about 673 mW cm$^{-2}$. In an embodiment, a current density of the electrocatalyst measured at a voltage of 0.5 V may be at least about 1239 mA cm$^{-2}$.

It should be noted that the single-step reduction technique, such as the hydrogen exfoliation technique as described above, for forming the metal nanoparticle-graphene composite 116 ensures optimal or complete utilization of the metal precursor and facilitates control over the metal loading as compared to other known synthesis techniques. In addition, the technique facilitates a high degree of dispersion of the metal nanoparticles 110 while achieving an optimum particle size of the metal nanoparticles 110.

The metal nanoparticle-graphene composite 116 formed using the present techniques may be configured as an electrocatalyst for use in a PEMFC for automotive and mobile applications. Moreover, the PEMFC's using such composites 116 may be utilized in power back-up systems.

The present invention will be described below in further detail with examples and comparative examples thereof, but it is noted that the present invention is by no means intended to be limited to these examples.

EXAMPLES

Example 1: Synthesis of Graphene Oxide-Hexachloroplatinic Acid (GO-HPA) Precursor About 400 mg of graphene oxide (GO) powder was dispersed in 50 ml of water by stirring. This was followed by the adding of about 20 ml of 1 wt % solution of hexachloroplatinic acid (HPA, $H_2PtCl_6.6H_2O$) in water to the GO-water mixture. The resulting mixture was stirred for about 2 hours to form the GO-HPA precursor. The GO-HPA precursor was dried at 60° C. in air.

Example 2: Synthesis of Platinum-Graphene Composite by Hydrogen Reduction

About 200 mg of the GO-HPA precursor from Example 1 was taken in a quartz boat and placed inside a tubular furnace. The furnace was sealed at both ends with end couplings, and provision for gas flow through the furnace was made. The furnace was flushed with argon gas for 15 minutes, followed by hydrogen gas for another 15 minutes at a temperature of about 200° C. Exfoliation of the GO-HPA precursor to form the platinum-graphene composite occurred, as can be seen from the formation of soot-like material accompanied by large volume expansion and change in color of the GO-HPA precursor from light brown to black, within the quartz boat. After the exfoliation, the furnace was flushed with hydrogen gas again for about 5 minutes at 200° C. The furnace was switched off, and flushed again with argon gas until the furnace cooled to room temperature. The resulting platinum-graphene composite was labeled as PtG-H. The projected Pt metal loading in the PtG-H was 30 wt %.

Example 3: PEMFC with PtG-H as a Cathode Electrocatalyst

Figure 2:
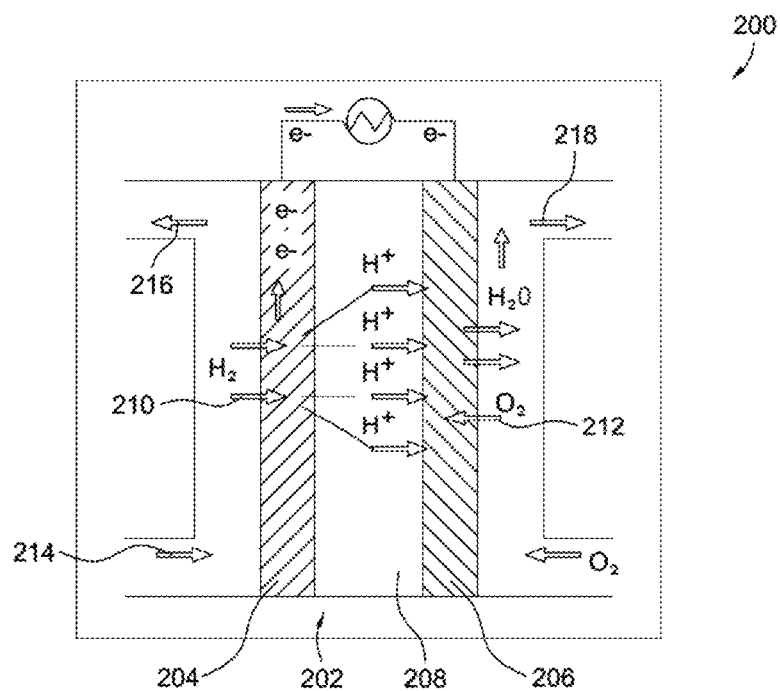
FIG. 2 illustrates an example configuration of a PEMFC assembled with a platinum-graphene composite used in a membrane electrode assembly (MEA) of the PEMFC.

FIG. 2 illustrates an example configuration 200 assembled with a platinum-graphene composite 116 used in a membrane electrode assembly (MEA) 202 of the proton exchange membrane fuel cell (PEMFC) 200. The platinum-graphene composite 116 was obtained from Example 2 (herein referred to as PtG-H) which was formed in accordance with the technique described with reference to FIG. 1.

In particular, the platinum-graphene composite 116 was formed by exfoliating graphite oxide 104 in the presence of hydrogen gas to form the hydrogen-exfoliated graphene sheet 114 and concurrently reducing the platinum precursor (hexachloroplatinic acid) 102 using hydrogen gas to disperse the platinum nanoparticles 110 on the hydrogen-exfoliated graphene sheet 114.

In the MEA 202, the anode 204 and the cathode 206 included a backing layer, a gas diffusion layer and a catalyst layer. The catalyst layer was prepared by ultrasonicating 5 mg of the platinum-graphene composite (PtG-H) in 200 µL of 2-propanol with about 5 µL of Nafion® solution (5 wt %), and uniformly coating the mixture over the gas diffusion layer using brush painting. Platinum loadings of about 0.25 mg cm$^{-2}$ and about 0.4 mg cm$^{-2}$ were maintained at the anode 204 and the cathode 206, respectively. The effective electrode area for both the anode 204 and cathode 206 was about 11.56 cm$^{-2}$.

The MEA 202 was prepared by placing a pre-treated Nafion® NR212 membrane 208 (obtained from DuPont Fuel Cells, DE, USA) between the anode 204 and the cathode 206. The membrane 208 was pressed between the anode 204 and the cathode 206 by hot-pressing at a temperature of about 130° C. and a pressure of about 70 bar for about 4 minutes. The MEA 202 was tested in a fuel cell test station by fixing it between two graphite plates, which had a provision for gas flow.

In operation, gas streams of pure hydrogen gas ($H_2$) 210 and oxygen gas ($O_2$) 212 were introduced on the anode 204 and cathode 206 sides and were controlled by respective mass flow controllers and the flow rates were maintained at about 100 sccm. Hydrogen 210 and oxygen 212 gases were humidified using humidifiers before feeding them into the anode 204 and the cathode 206 sides, respectively. A fuel 214 such as including methanol and water was supplied on the anode 204 side and carbon dioxide and water were discharged thereon.

Following the reaction, the excess fuel along with water and heat were removed from the fuel cell 200, as represented by reference numerals 216 and 218. Subsequently, fuel cell measurements were performed using a fuel cell test station. The performance of the fuel cell was studied at three different temperatures of about 40° C., 50° C., and 60° C. respectively and a relative humidity of about 90% without any back pressure. The fuel cell measurements will be further discussed in Examples 8 and 9.

Example 4: Characterization of the PtG-H Electrocatalyst Used in the Fuel Cell of Example 3

Figure 3:
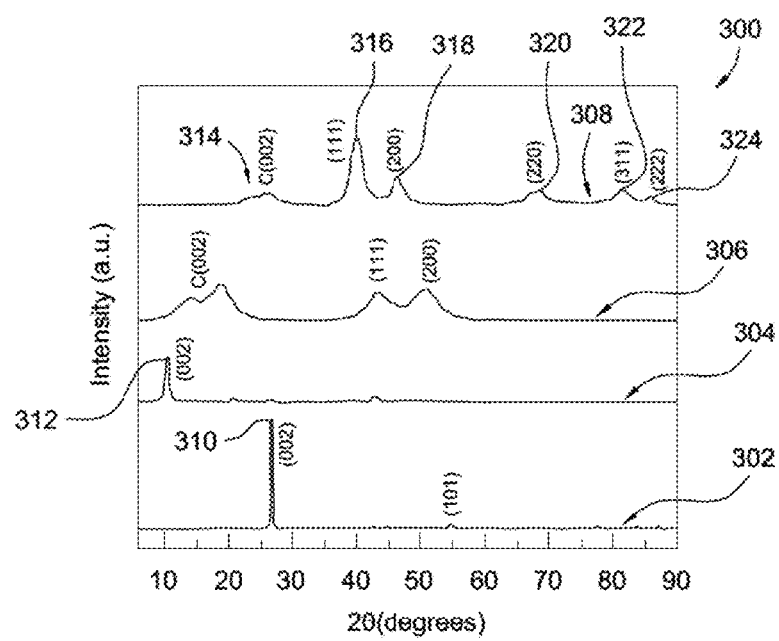
FIG. 3 illustrates X-ray diffractograms of materials and/or compositions used/formed at different stages of forming a platinum-graphene composite.

FIG. 3 illustrates X-ray diffractograms 300 of materials and/or compositions used/formed at different stages of forming the platinum-graphene composite (PtG-H) of Example 2. The X-ray diffractograms obtained for graphite and graphite oxide are represented by reference numerals 302 and 304 respectively. Moreover, the X-ray diffractograms obtained for graphite oxide-hexachloroplatinic acid (GO-HPA) composite powder and the platinum-graphene composite (PtG-H) synthesized via the hydrogen exfoliation technique described in Example 2 above are represented by reference numerals 306 and 308 respectively.

As can be seen, an intense crystalline peak (generally represented by reference numeral 310) was observed at a 2θ value of about 26.73°, which is the characteristic peak of the (002) plane in hexagonal graphite with a d-spacing of about 0.34 nm. Moreover, oxidation of graphite powder resulted in a shift in the peak (as represented by reference numeral 312) to about 10.54°, which corresponds to the (002) plane of graphite oxide. In addition, an increase in the interlayer spacing to about 0.84 nm confirmed the intercalation of functional groups during the oxidation procedure.

As can be seen from the diffractogram 306 of graphite oxide and hexachloroplatinic acid mixture (GO-HPA), after hydrogen-exfoliation of the GO-HPA precursor at a temperature of about 200° C., the peak 312 (corresponding to the 2θ value of about 10.54°) had disappeared and a broad feature 314 ranging from about 20° to about 28° was observed. This broad feature 314 was indicative of a loss of a long-range order in the stacked layers of graphene. In addition, the interlayer spacing was reduced to about 0.37 nm, which indicated the removal of oxygen and water from the layers during exfoliation.

Here, the interlayer spacing of exfoliated graphene is relatively higher than the starting graphite powder, which was indicative of the loosening of graphene layers along the c-axis. Moreover, the presence of the platinum peaks at (111), (200), (220), (311) and (222) planes (represented by reference numerals 316, 318, 320, 322 and 324 respectively) after the exfoliation of GO-HPA indicated that platinum precursor was completely reduced to Pt nanoparticles in the platinum-graphene composite (PtG-H) sample. Moreover, Scherrer's formula was used to determine the crystallite size of the platinum-graphene composite (PtG-H) sample and the crystallite size was measured to be about 3.6 nm.

Example 5: Surface Morphology Patterns of the PtG-H Electrocatalyst Used in the Fuel Cell of Example 3

Figures 4, 5:
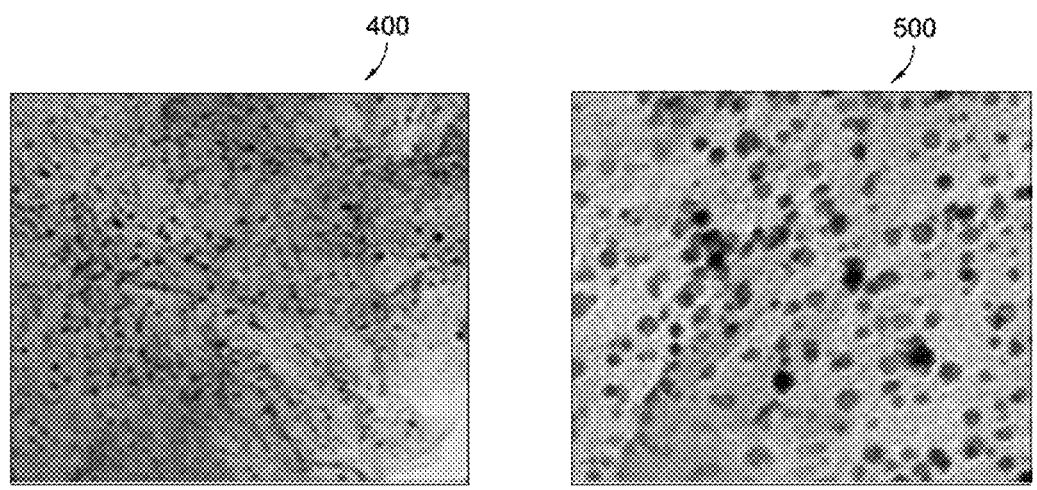
FIG. 4 is a low magnification transmission electron microscope (TEM) image of a synthesized platinum-graphene composite electrocatalyst used in the fuel cell of FIG. 2.
FIG. 5 is a high magnification transmission electron microscope (TEM) image of the synthesized platinum-graphene composite electrocatalyst used in the fuel cell of FIG. 2.
Figure 6:
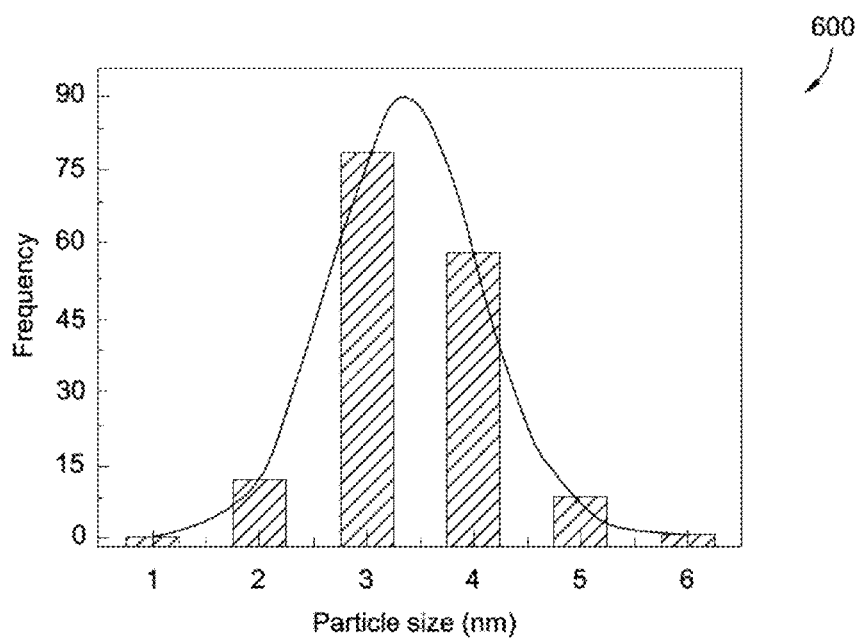
FIG. 6 illustrates particle size distribution of the platinum nanoparticles in the synthesized platinum-graphene composite electrocatalyst.

FIGS. 4 and 5 are low and high magnification transmission electron microscope (TEM) images 400 and 500 of the synthesized platinum-graphene (PtG-H) electrocatalysts from Example 2. As can be seen, a layered structure of graphene with a uniform distribution of platinum nanoparticles is clearly visible from the images 400 and 500. Moreover, the particle size distribution 600 of the platinum nanoparticles in the synthesized platinum-graphene (PtG-H) electrocatalyst of Example 2 is shown in FIG. 6. Here, the average particle size of the platinum nanoparticles measured from the TEM images 400 and 500 was about 3.3 nanometers (nm).

Figures 7, 8:
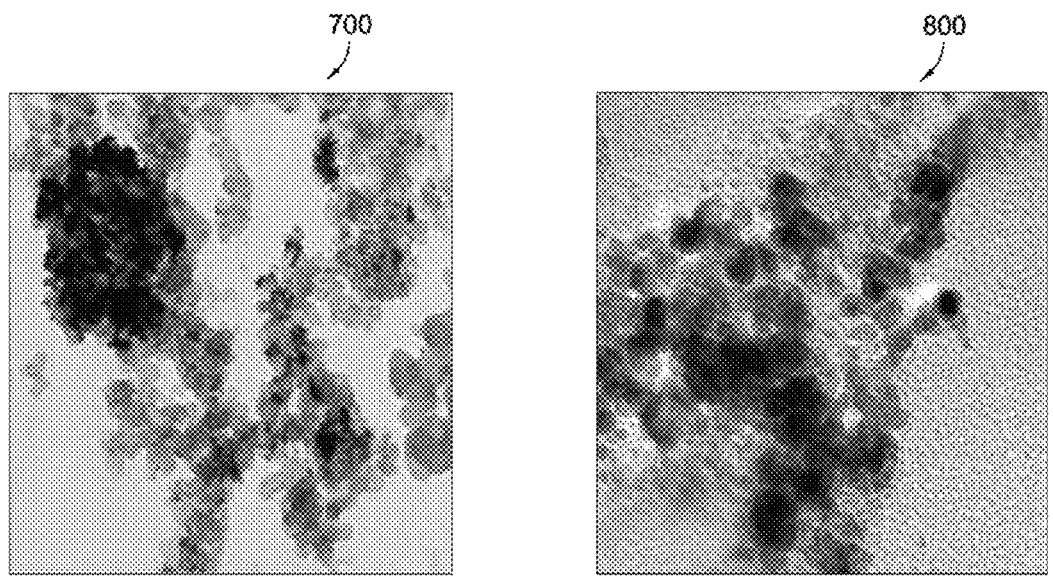
FIG. 7 is a low magnification transmission electron microscope (TEM) image of a commercial platinum-carbon electrocatalyst.
FIG. 8 is a high magnification transmission electron microscope (TEM) image of a commercial platinum-carbon electrocatalyst.
Figure 9:
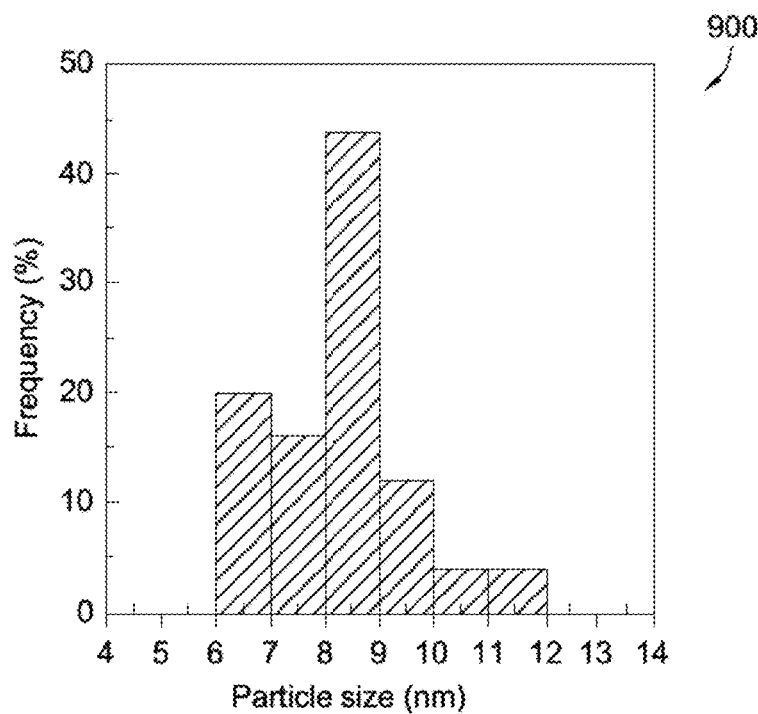
FIG. 9 illustrates particle size distribution of the platinum nanoparticles in the commercial platinum-carbon electrocatalyst.

Example 6: Surface Morphology Patterns of a Commercial Platinum-Carbon Electrocatalyst FIGS. 7 and 8 are low and high magnification transmission electron microscope (TEM) images 700 and 800 of a commercial platinum-carbon electrocatalyst. As can be seen, substantial agglomeration of platinum nanoparticles in the electrocatalyst is visible from the images 700 and 800. The agglomeration of the platinum nanoparticles is due to weak interaction between the nanoparticles and the carbon support. Moreover, the particle size distribution 900 of the platinum nanoparticles in the electrocatalyst is shown in FIG. 9. Here, the average particle size of the platinum nanoparticles measured from the TEM images 400 was about 8.34 nm.

As can be seen, the present technique for synthesizing the electrocatalyst resulted in substantially dispersed metal nanoparticles in the electrocatalyst as compared to the commercial platinum-carbon electrocatalysts. Moreover, the average particle size of the nanoparticles in the platinum-graphene (PtG-H) electrocatalyst synthesized using the present technique as described in Example 2 was substantially lower as compared to size of the nanoparticles in the commercial electrocatalysts.

Example 7: EDX Spectrum and Cyclic Voltammograms of the PtG-H Electrocatalyst Used in the Fuel Cell of Example 3

Figure 10:
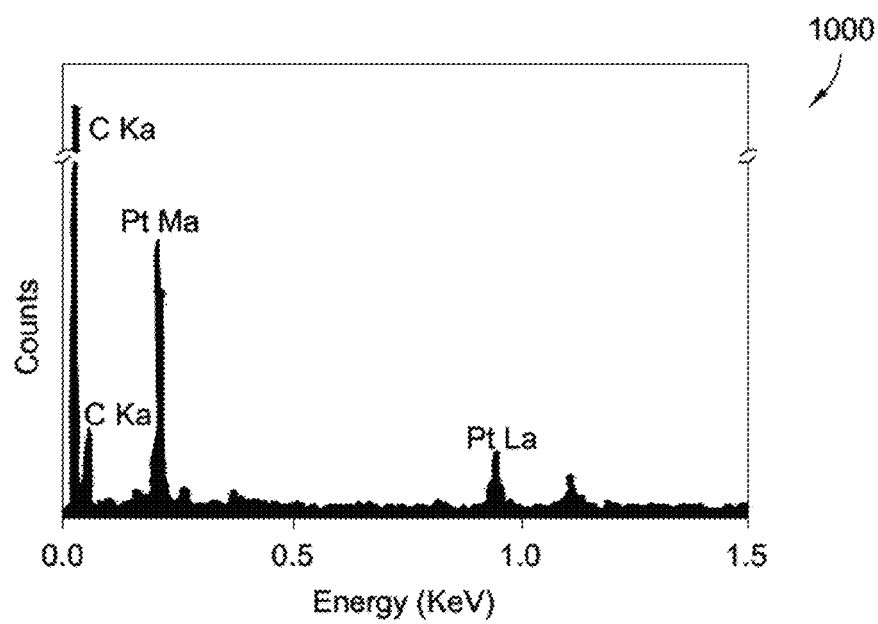
FIG. 10 is an example EDX spectrum of platinum-graphene composite electrocatalyst used in the fuel cell of FIG. 2.

FIG. 10 is an example energy dispersive X-ray (EDX) spectrum 1000 of the platinum-graphene composite electrocatalyst synthesized using the present technique as described in Example 2. As can be seen from the spectrum 1000, the platinum metal loading in the electrocatalyst was measured to be about 30 wt %, which is consistent with the projected loading of 30 wt % described in Example 2. This indicates that the entire platinum chloride present in the GO-HPA precursor for synthesizing the electrocatalyst was reduced to platinum nanoparticles.

Figure 11:
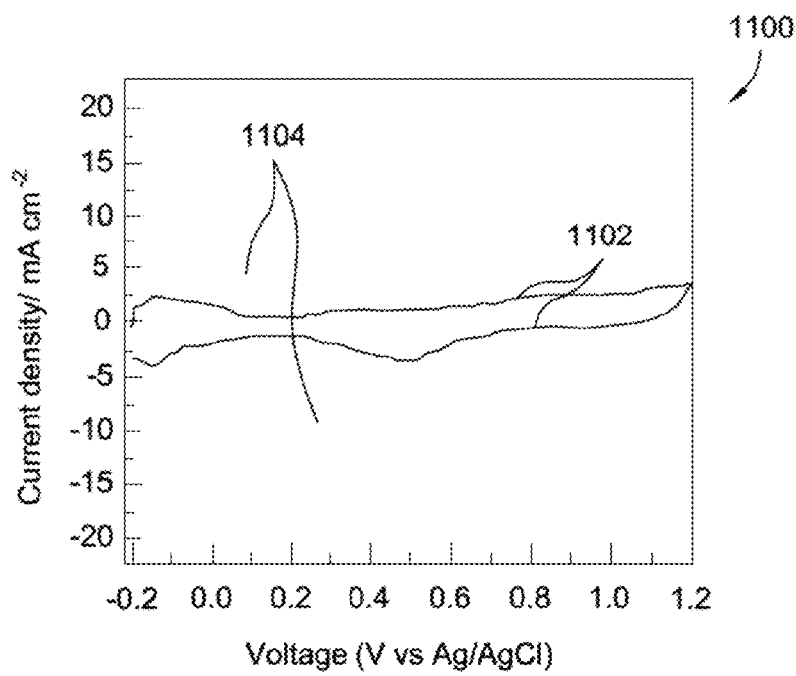
FIG. 11 illustrates example cyclic voltammograms obtained for a commercial platinum-carbon (Pt/C) and the platinum-graphene composite electrocatalyst used in the fuel cell of FIG. 2.
Figure 12:
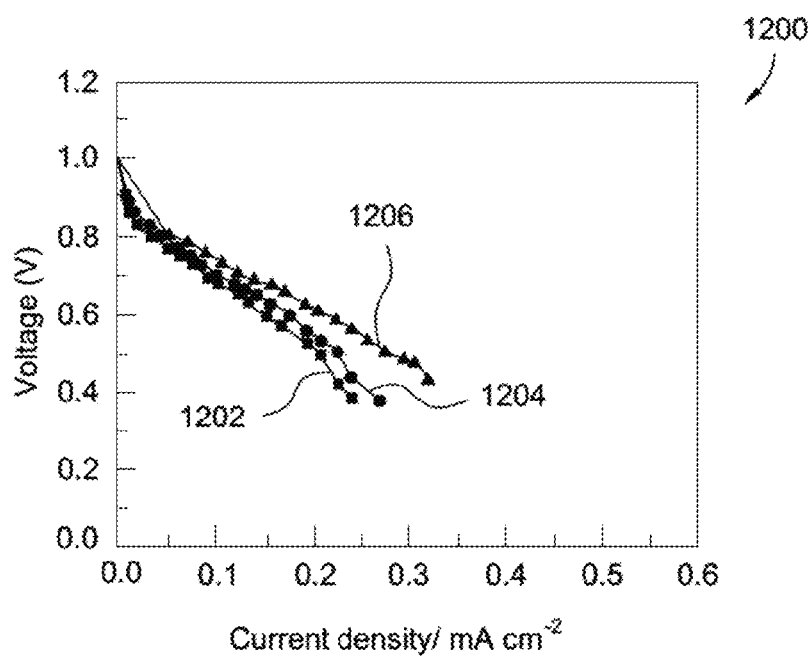
FIG. 12 illustrates example polarization curves for a commercial Pt/C electrocatalyst.

FIG. 11 illustrates example cyclic voltammograms (CVs) 1100 obtained for a commercial platinum-carbon (Pt/C) electrocatalyst and the platinum-graphene composite (PtG-H) electrocatalyst synthesized using the present technique as described in Example 2. The cyclic voltammograms of electrocatalysts were used to determine the electrochemical surface area (ECSA) of the electrocatalysts. Here, the cyclic voltammograms (CVs) obtained for the commercial Pt/C electrocatalyst are represented by reference numeral 1102 and the cyclic voltammograms obtained for the platinum-graphene composite electrocatalyst are represented by reference numeral 1104. FIG. 12 illustrates example polarization curves 1200 for the commercial Pt/C electrocatalyst. The polarization curves obtained at temperatures of 40° C., 50° C. and 60° C. without application of any back pressure are represented by reference numerals 1202, 1204 and 1206 respectively.

The CVs of the electrocatalysts were acquired by scanning the potential from about −0.2 V to about 1.2 V vs. Ag/AgCl in 1 M $H_2SO_4$. Here, the scanning rate was maintained at about 50 $mVs^{-1}$. The electrochemical surface area for the commercial Pt/C and the platinum-graphene composite (PtG-H) of Example 2 were measured to be about 42 $m^2g^{-1}$ and 101.3 $m^2g^{-1}$ respectively. As can be seen, the electrochemical surface area for the platinum-graphene composite (PtG-H) electrocatalyst of Example 2 was about 2.4 times higher than that of commercial Pt/C owing to the highly dispersed nature of the platinum nanoparticles and a relatively smaller particle size of the platinum nanoparticles on the graphene surface. These results indicated substantial utilization of the platinum in the present platinum-graphene composite electrocatalyst (PtG-H).

Figure 13:
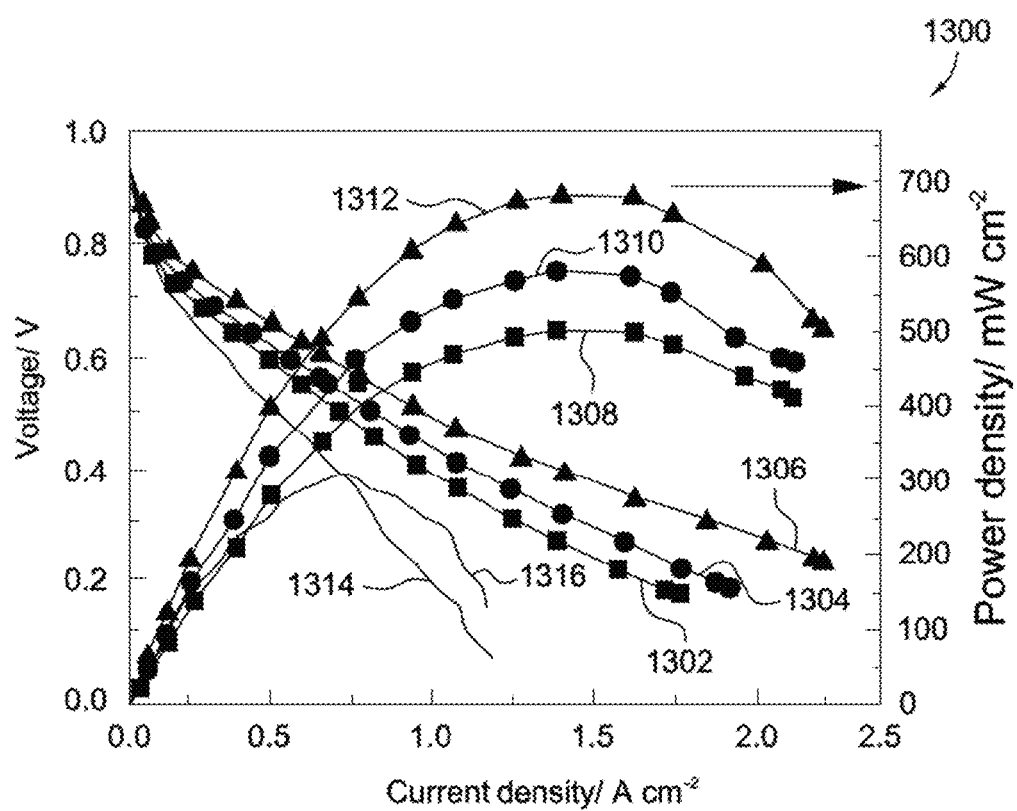
FIG. 13 illustrates polarization curves with a cathode having the platinum-graphene composite electrocatalyst synthesized by the present hydrogen exfoliation technique.

Example 8: Polarization Curves of Platinum-Graphene Composite (PtG-H) Cathode Electrocatalyst and Commercial Platinum-Carbon Cathode Electrocatalyst FIG. 13 illustrates polarization curves 1300 of a cathode having the platinum-graphene composite (PtG-H) electrocatalyst synthesized by the hydrogen exfoliation technique as described in Example 2, and used in the fuel cell as described in Example 3. The polarization curves 1300 were generated at temperatures of about 40° C., 50° C. and 60° C. respectively without applying any back pressure. Here, the curves for current density at temperatures of about 40° C., 50° C. and 60° C. are represented by reference numerals 1302, 1304 and 1306 respectively. Further, the curves for power density at temperatures of about 40° C., 50° C. and 60° C. are represented by reference numerals 1308, 1310 and 1312 respectively.

In addition, the curves for current density and power density for a commercial Pt/C electrocatalyst obtained at a temperature of about 60° C. are represented by reference numeral 1314 and 1316 respectively. The commercial Pt/C composite was used as a cathode electrocatalyst in a fuel cell of similar configuration as Example 3.

The current density for commercial Pt/C with a Pt loading of about 0.4 $mgcm^{-2}$ and 0.25 $mgcm^{-2}$ for cathode and anode respectively without applying any back pressure at the temperature of about 60° C. was measured to be about 514 $mAcm^{-2}$ at a potential of about 0.5 V. Moreover, the current density measured at a potential of about 0.5 V for the platinum-graphene composite (PtG-H) electrocatalyst of Example 2 was measured to be about 1239 $mAcm^{-2}$, which is about 2.4 times higher than that of the Pt/C commercial catalyst.

In addition, the maximum power density measured at a temperature of about 60° C. for the Pt/C commercial electrocatalyst and for the platinum-graphene composite (PtG-H) electrocatalyst was about 289 and 673 $mWcm^{-2}$ respectively. Thus, a performance enhancement of about 2.3 times was achieved using the platinum-graphene composite (PtG-H) as a cathode electrocatalyst in the fuel cell as described in Example 3.

Figure 14:
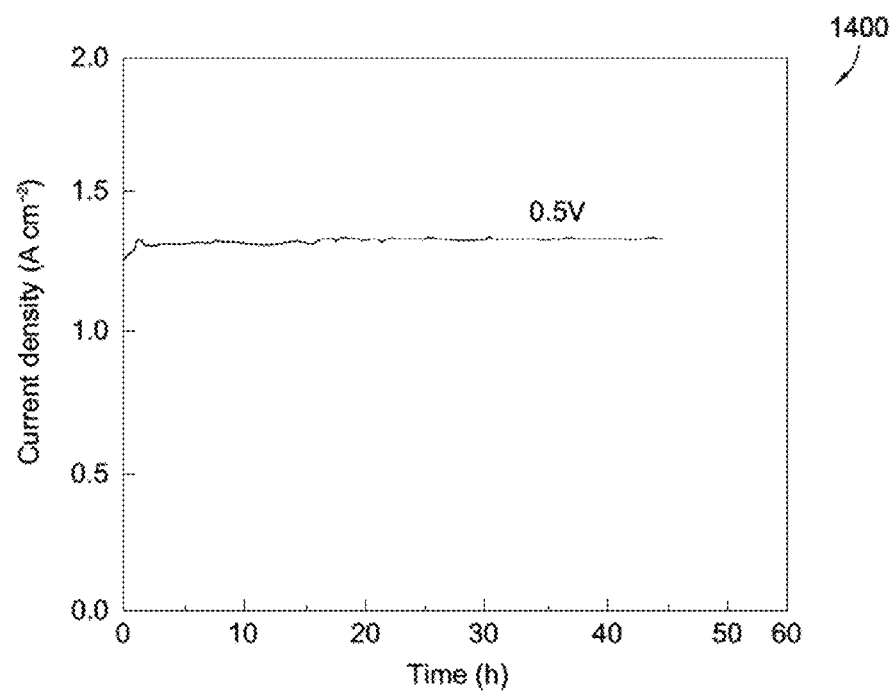
FIG. 14 illustrates example results for stability tests performed on the metal nanoparticle-graphene composite used as an electrocatalyst in the fuel cell of FIG. 2.
Figure 15:
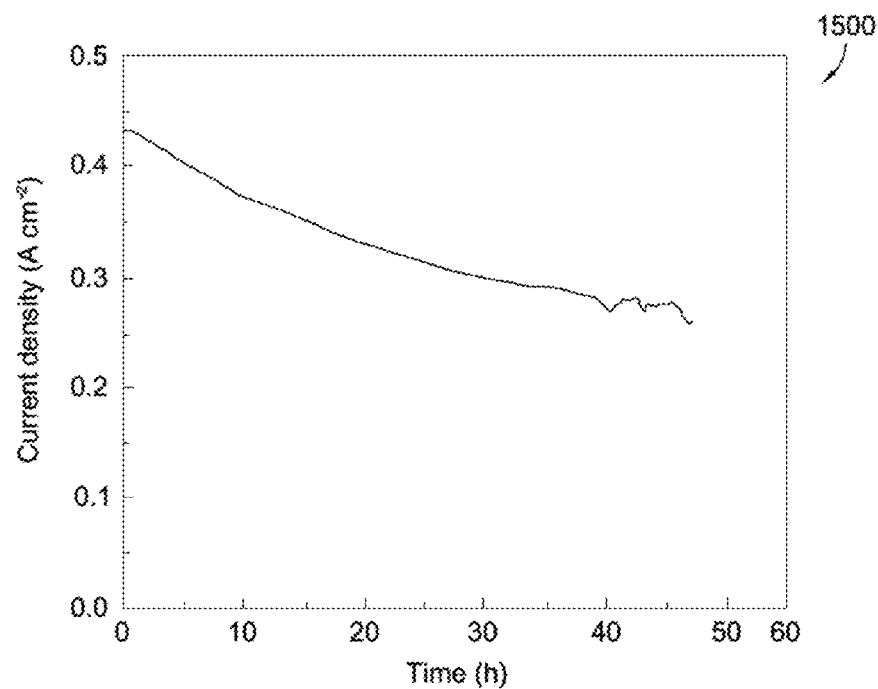
FIG. 15 illustrates example results for stability tests performed on commercially available platinum-carbon electrocatalyst.

Example 9: Stability Tests Performed on the Platinum-Graphene Composite (PtG-H) Electrocatalyst and a Commercial Platinum-Carbon Electrocatalyst The platinum-graphene composite (PtG-H) electrocatalyst used in the fuel cell as described in Example 3 was observed to be substantially stable. FIGS. 14 and 15 are stability test results for the platinum-graphene composite (PtG-H) electrocatalyst (1400) and a commercially available platinum-carbon electrocatalyst (1500). Here, a stability run was performed for the platinum-graphene composite used as an electrocatalyst in the fuel cell of Example 3 and for a commercially available E-TEK platinum-carbon electrocatalyst, for a period of about 50 hours at a potential of about 0.5 V.

As can be seen from current density profiles 1400 and 1500, a fuel cell assembled using the platinum-graphene composite (PtG-H) electrocatalyst was substantially stable over the testing period as indicated by the substantially horizontal line in 1400 showing consistent current density over time. The fuel cell delivered a current density of about 1.29 A $cm^{-2}$ at 0.5 V without any degradation in performance. The commercial platinum-carbon electrocatalyst, on the other hand, showed an almost immediate and gradual decline in current density (about 40% degradation) over time as indicated by the downward sloped line in 1500.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to form a metal nanoparticle-graphene composite, the method comprising:
   mixing a metal precursor with graphite oxide in presence of a liquid medium to form a metal precursor-graphite oxide mixture;
   exfoliating the graphite oxide of the metal precursor-graphite oxide mixture with hydrogen to chemically modify the graphite oxide to form a hydrogen-exfoliated graphene sheet; and
   while exfoliating the graphite oxide, simultaneously reducing the metal precursor in the metal precursor-graphite oxide mixture to adsorb metal nanoparticles on a first major surface of the hydrogen-exfoliated graphene sheet.

2. The method of claim 1, wherein the metal nanoparticles comprise platinum (Pt), palladium (Pd), silver (Ag), gold (Au), nickel (Ni), titanium (Ti), tin (Sn), ruthenium (Ru), or combinations thereof.

3. The method of claim 1, wherein the metal precursor comprises platinum (Pt), palladium (Pd), silver (Ag), gold (Au), nickel (Ni), titanium (Ti), tin (Sn), ruthenium (Ru), or combinations thereof.

4. The method of claim 1, wherein the metal precursor comprises hexachloroplatinic acid ($H_2PtCl_6 \cdot 6H_2O$).

5. The method of claim 1, wherein the liquid medium is water, acetone, ethanol, toluene, or combinations thereof.

6. The method of claim 1, further comprising drying the metal precursor-graphite oxide mixture before exfoliating the graphite oxide of the metal precursor-graphite oxide mixture.

7. The method of claim 1, wherein exfoliating the graphite oxide and reducing the metal precursor comprises:
   contacting hydrogen gas ($H_2$) with oxygen-based functional groups of the graphite oxide within a reaction chamber to form the hydrogen-exfoliated graphene sheet; and
   reducing the metal precursor using a hydrogen gas to attach the metal nanoparticles to the hydrogen-exfoliated graphene sheet.

8. The method of claim 7, wherein a temperature within the reaction chamber is about 200° C. to about 600° C.

9. The method of claim 7, wherein a flow rate of the hydrogen gas within the reaction chamber is about 50 sccm to about 200 sccm.

10. The method of claim 7, wherein substantially 100% of the metal precursor is reduced to the metal nanoparticles attached to the hydrogen-exfoliated graphene sheet.

11. The method of claim 7, wherein the metal precursor is reduced to the metal nanoparticles within about 10 seconds to about 15 seconds.

12. The method of claim 1, wherein the metal precursor comprises hexachloroplatinic acid ($H_2PtCl_6 \cdot 6H_2O$) and the metal nanoparticles comprise platinum nanoparticles.

13. The method of claim 1, wherein a density of graphene in the metal nanoparticle-graphene composite is about 0.5 g/cm$^3$ to about 0.8 g/cm$^3$.

14. A mixture comprising:
a metal precursor;
graphite oxide;
hydrogen gas;
a liquid medium;
a hydrogen-exfoliated graphene sheet; and
a plurality of platinum nanoparticles dispersed on a first major surface of the hydrogen-exfoliated graphene sheet.

15. The mixture of claim 14, wherein the metal precursor comprises platinum (Pt), palladium (Pd), silver (Ag), gold (Au), nickel (Ni), titanium (Ti), tin (Sn), ruthenium (Ru), or combinations thereof.

16. The mixture of claim 14, wherein the metal precursor comprises hexachloroplatinic acid ($H_2PtCl_6 \cdot 6H_2O$).

17. The mixture of claim 14, wherein the liquid medium is water, acetone, ethanol, toluene, or combinations thereof.

18. The mixture of claim 14, wherein the hydrogen-exfoliated graphene sheet and the plurality of platinum nanoparticles dispersed on the first major surface of the hydrogen-exfoliated graphene sheet to form an electrocatalyst, an average size of the platinum nanoparticles of the platinum nanoparticles is about 3 nanometers to about 5 nanometers, and a current density of the electrocatalyst is at least about 1239 mA cm$^{-2}$.

19. The mixture of claim 18, wherein the current density is measured at a voltage of 0.5 V.

20. The mixture of claim 14, wherein an average particle size of the plurality of platinum nanoparticles is about 3.3 nanometers.

* * * * *